United States Patent [19]
Klockner

[11] Patent Number: 5,062,739
[45] Date of Patent: Nov. 5, 1991

[54] ZIGZAG BREAKWATER

[76] Inventor: Albrecht Klockner, Spreitgen, D-5223 Numbrecht, Fed. Rep. of Germany

[21] Appl. No.: 657,378

[22] Filed: Feb. 19, 1991

Related U.S. Application Data

[63] Continuation of Ser. No. 544,016, Jun. 27, 1990, abandoned, which is a continuation of Ser. No. 810,288, filed as PCT/DE84/00071 Mar. 29, 1984, published as WO85/04436 Oct. 10, 1985, abandoned.

[30] Foreign Application Priority Data

Sep. 25, 1982 [DE] Fed. Rep. of Germany ....... 3235602

[51] Int. Cl.$^5$ .............................................. E02B 3/06
[52] U.S. Cl. ....................... 405/21; 405/26; 405/31
[58] Field of Search ............ 405/15, 21, 25, 30, 405/31, 33, 34, 35

[56] References Cited

U.S. PATENT DOCUMENTS

| | | | |
|---|---|---|---|
| 420,928 | 2/1890 | Case | 405/31 |
| 2,191,924 | 2/1940 | Humphrey | 405/33 |
| 2,755,631 | 7/1956 | Hayden | 405/34 |
| 2,941,371 | 6/1960 | Benedict | 405/285 |

FOREIGN PATENT DOCUMENTS

| | | | |
|---|---|---|---|
| 2223515 | 10/1974 | France | |
| 4011 | 1/1983 | Japan | 405/30 |
| 425124 | 3/1935 | United Kingdom | 405/30 |

Primary Examiner—David H. Corbin

[57] ABSTRACT

Stationary zigzag breakwater embedded into the sea bottom or floating breakwater. The determining factor for the wave-reflecting characteristics and the structural stability of the breakwater is the appropriate dimensioning of the zigzag elements. In stationary breakwaters embedded into the sea bottom, the length (1) of the zigzag elements is at least equal to or greater, preferably 5 to 8 times as great or greater, than the depth of water (d). The total height (h) of the wave-reflecting side walls is at least equal to or greater than the depth of water (d), preferably 2 to 2.5 times greater than the depth of water (d). In floating breakwaters, the length (1) of the zigzag elements is at least equal to or greater than half of the maximum foreseeable wave length. The total height (h) of the wave-reflecting side walls (11) is at least equal to or greater than 1 to 1.5 times the maximim foreseeable wave height. The zigzag elements (7, 8) are interconnected by means of oscillation-damping connecting members (9).

1 Claim, 10 Drawing Sheets

ZIGZAG BREAKWATER

This is a continuation of application Ser. No. 07/544,016, filed on Jun. 27, 1990, which was abandoned upon the filing hereof which in turn is an FWC of application Ser. No. 06/810,288, filed as PCT/DE84/00071 Mar. 29, 1984, published as W085/04436 Oct. 10, 1985, now abandoned.

The subject matter of this invention is a zigzag breakwater according to the definition of the species of Patent claim 1. It is the objection of such a zigzag breakwater which may or may not be connected to the shore—to reflect attacking waves by means of its side walls which run essentially perpendicular to the calm water surface and to reduce the force of the wave action impinging on the breakwater by means of interference between the attacking and the reflected waves. Two types of breakwaters are distinguished stationary breakwaters embedded into the sea bottom and floating breakwaters, e.g., anchored by means of hawsers.

Stationary zigzag breakwaters embedded into the bottom of the sea are known for example, from U.S. Pat. Nos. 2,191,924 and 2,941,371, as well as from British Patent 636,840. Floating zigzag breakwaters are described in British Patent No. 1,559,845. The documents mentioned treat different structural designs of zigzag breakwaters; however, no significance is attributed to the dimensions potentially to be adhered to and therefore no mention is made thereof.

It was discovered that the dimensions of the zigzag breakwater are of crucial significance, both relative to the wave-reflecting characteristics and to the stability of the structure. A decisive factor in determining the dimensions is, first of all, the maximum foreseeable impact of the waves (height and length of the waves) and, second, the depth of water into which the stationary structure is to be embedded. Zigzag breakwaters with short lengths of the zigzag elements, such as discussed in the documents mentioned, react to long and high waves very much like breakwaters with a straight-line front, which under heavy wave action are subjected to such high stresses that damage or even complete destruction is again and again to be expected. Floating zigzag breakwaters run the risk of being thrown into oscillations by the motion of the sea, which—in the case of a rigid construction as described in British Patent No. 1,599,845—inevitably cause the breakwater to be destroyed if the wave action is heavy.

It is the objective of this invention to create an either stationary zigzag breakwater embedded into the sea bottom or a floating breakwater which meets the structure stability requirements during maximum foreseeable wave action.

According to this invention, this problem is solved by a stationary zigzag breakwater embedded into the sea bottom or a floating breakwater, such as characterized by claims 1 and 4. Further developments of this invention are described in the dependent claims.

For stationary breakwaters embedded into the sea bottom, it was discovered that the length l of the zigzag elements and the total height h of the wave-reflecting side wall of the zigzag elements depend to a considerable degree of the water depth d (at calm water level) at the site of grounding. The following rules for dimensioning (the breakwater components) apply:

$l \geq d$, preferably $l \geq 5$ to $8$ d and at the same time $h \geq d$, preferably $h = 2$ to $2.5$ d.

For floating constructions, the following dimensions rules apply according to this invention:

$$l \geq \frac{\lambda_{max}}{2}$$

where $\lambda$ denotes the maximum foreseeable wave length to be reflected and $h \geq H_{max}$, preferably $h \geq 1.5\ H_{max}$, where $H_{max}$ is the maximum foreseeable wave height to be reflected. The freeboard height f should amount to approximately ¼ of the total height h of the wave-reflecting side wall, i.e., in calm water, the side wall should be ¾ below water level and ¼ above water level in order to ensure that on wave action, the structure is not excessively awash. In addition, the individual zigzag elements in floating breakwaters are to be interconnected by means of oscillationdamping connecting members to ensure that the portion of the long sea waves exceeding the wave action to be reflected can be "ridden out" without an excessively high stress on the structure.

This invention will be explained in greater detail by means of the appended drawings. It can be seen that FIGS. 1 and 2 show a lateral view and a top view of a stationary zigzag breakwater embedded into the sea bottom which is assaulted by a single wave;

Figure 1:
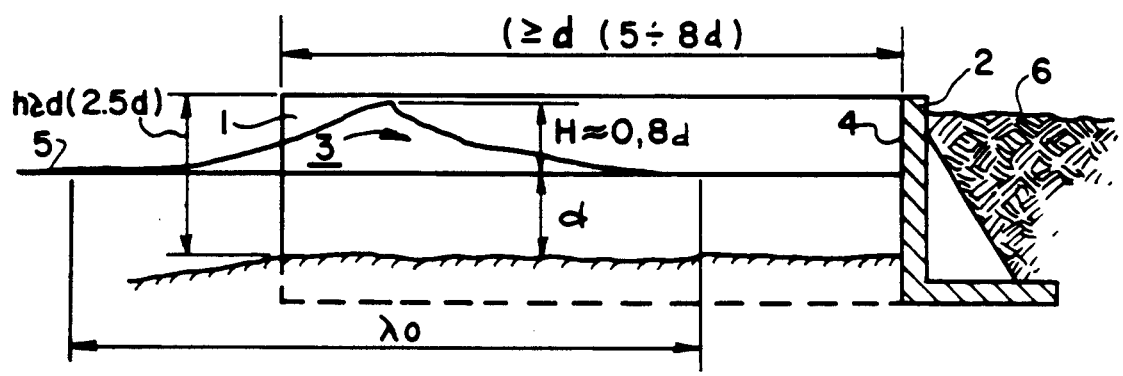
Figure 2:
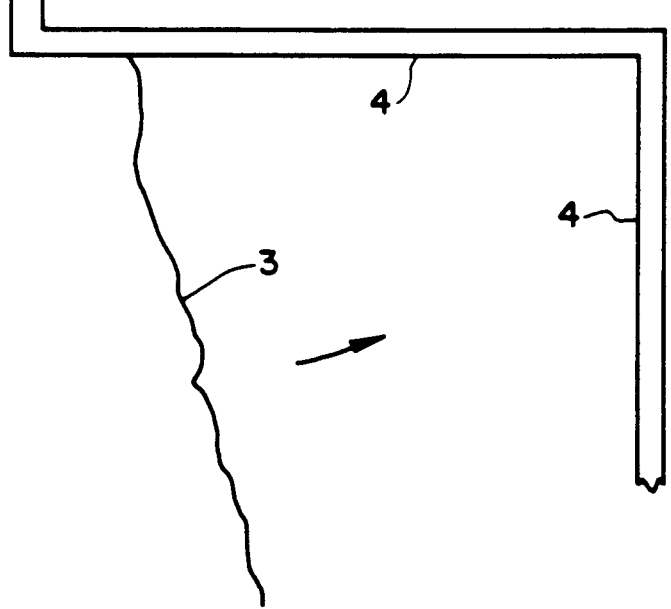

The stationary zigzag breakwater embedded into the sea bottom according to FIGS. 1 and 2 consists of straight zigzag elements 1 and 2 which form essentially right angles with each other and which in the cross-sectional profile can be, e.g., L-shaped concrete components whose side walls 4 facing the waves 3 essentially run perpendicular to the calm water surface 5. The zigzag elements 1 and 2 are placed, for example, close to a coastline 6 and the area behind the breakwater that slopes toward the shore is filled in with rocks.

The length l of the zigzag elements 1 and 2 is at least equal to or greater than the depth of water d (in calm water) and preferably 5 to 8 times greater than the depth of water d. The total height h of the wave-reflecting side walls 4 is at-least equal to or greater than the depth of water d and preferably 2 to 2.5 times greater than the depth of water d.

Reason: below the shallow water limit $d/\lambda = 0.5$ ($\lambda$ = wave length), waves are no longer able to maintain the full deep water steepness $H/\lambda \approx 1/7$ (H — height of waves), but instead the waves break, i.e, only less steep waves of this wave length can continue without breaking and arrive at the structure. If the waves which run into the shallow water are very long ($d/\lambda < 0.1$), so-called "single waves" form which start breaking at $$\frac{h}{d} = 0.78 \text{ (McCowan limit).}$$

This means that it is not possible for a wave higher than approximately 4/5 of the water depth d to form in shallow water and to reach the structure. However, such a single wave which just does not break yet still runs practically at its full height above the calm water level, the wave trough being very long and very shallow.

For this reason, a so called "base length" 0 of the single wave is introduced which in simplified but sufficiently accurate form can be calculated as $$\lambda_0 \approx 10 H - 8 d. \text{ (See FIG. 1).}$$

Figure 3:
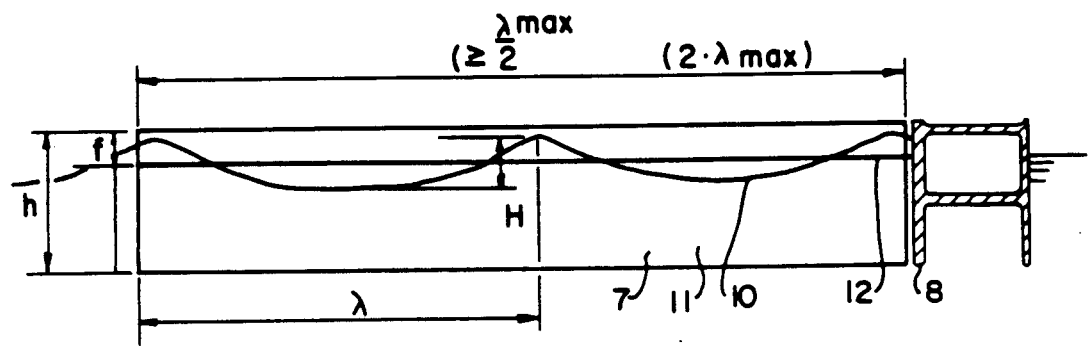
FIGS. 3 and 4 show a lateral view and a top view of a floating breakwater which is assaulted by approaching waves.
Figure 4:
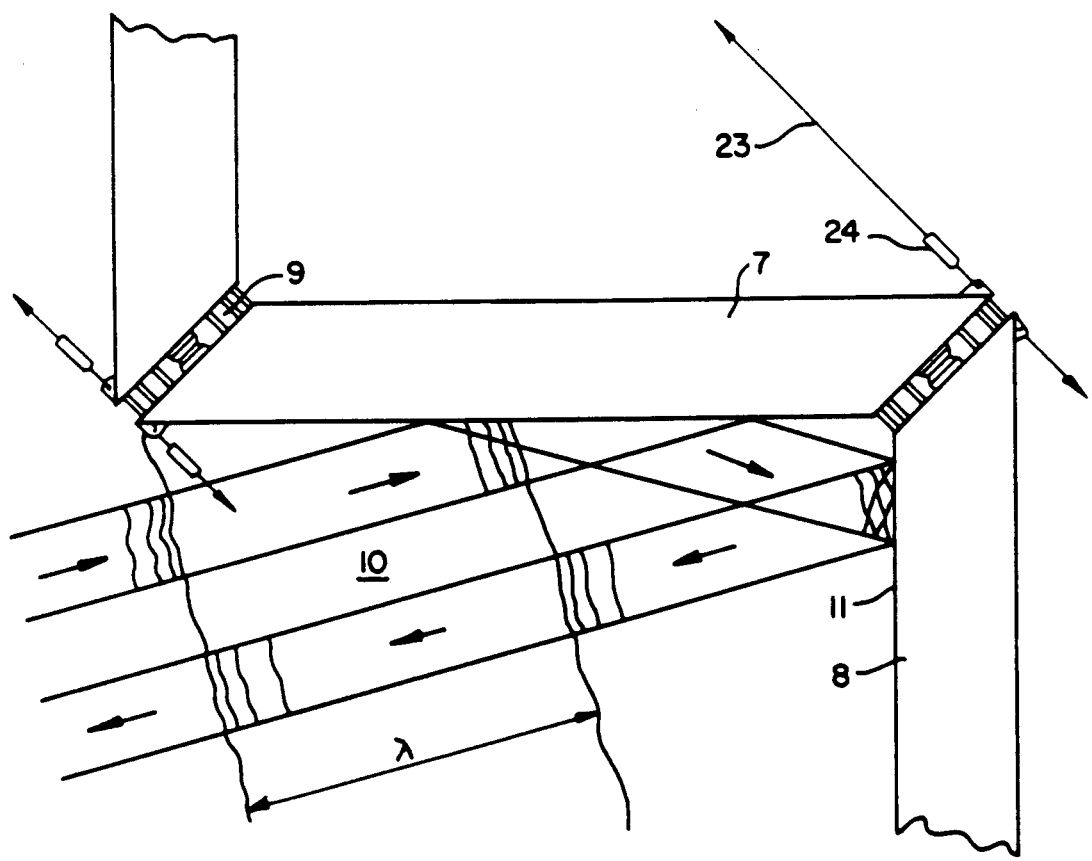

The floating zigzag breakwater according to FIGS. 3 and 4 consists of the zigzag elements 7 and 8 which form essentially right angles with each other and which are interconnected by means of oscillationdamping connecting elements 9 along the adjoining end surfaces which are beveled at an angle of 45°. The side walls 11 facing the waves 10 again run essentially perpendicular to the calm water surface 12.

The length 1 of the zigzag elements 7 and 8 is at least equal to or greater than half of the maximum foreseeable wave length $\lambda_{max}$. The total height h of the wave-reflecting side walls 11 is at least equal to or larger than the maximum foreseeable wave height $H_{max}$.

Reason: if no special oscillation-damping measures, such as the connecting elements 9, are provided, a zigzag breakwater with shorter lengths (of the zigzag elements) or during longer-wave sea motion is thrown into oscillations and is no longer able to effectively reflect this portion of the long-wave motion. Short-wave motion is definitely reflected without oscillation-damping measures up to a length of $$l \geq 2 \lambda.$$

In sufficiently deep water, the experimentally as well as theoretically determined relationship between and H is:

$$(H/\lambda)_{max} = 0.14 \approx 1/7 \text{ (Mitchell-Havelock limit);}$$

it is not possible for the waves to be steeper and socalled breakers form.

Experience shows that height of $h \geq H_{max}$ provides sufficient protection. The protection is more statisfactory from $$h \geq 1.5 H_{max}$$

on. The freeboard height should be $f \approx 1/4/ h$, i.e., in calm water, the side wall 11 should be ¾ below and ¼ above water level to ensure that on wave action, the structure is not excessively awash.

Without oscillation-damping measures, structures with the dimensions recommended above provide the advantageous countermarching.

It is not always possible to prevent a floating zigzag breakwater with zigzag elements of a given length 1 from being occasionally subjected to longr waves than is normal under the usually prevailing wave conditions. The structure cannot reflect the long-wave portion f the sea motion, however, it must be able to "ride it out." This can be achieved by means of the oscillation-damping connecting members 9. In the normal range of wave action, these connecting members are able to maintain the zigzag elements 7 and 8 at sufficiently stationary right angles to each other, but in cases of emergency, they provide sufficient freedom of movement while damping the relative motion f the elements to the extent that inthe case of resonance,no excessive amplitudes can build up.

Figure 5:
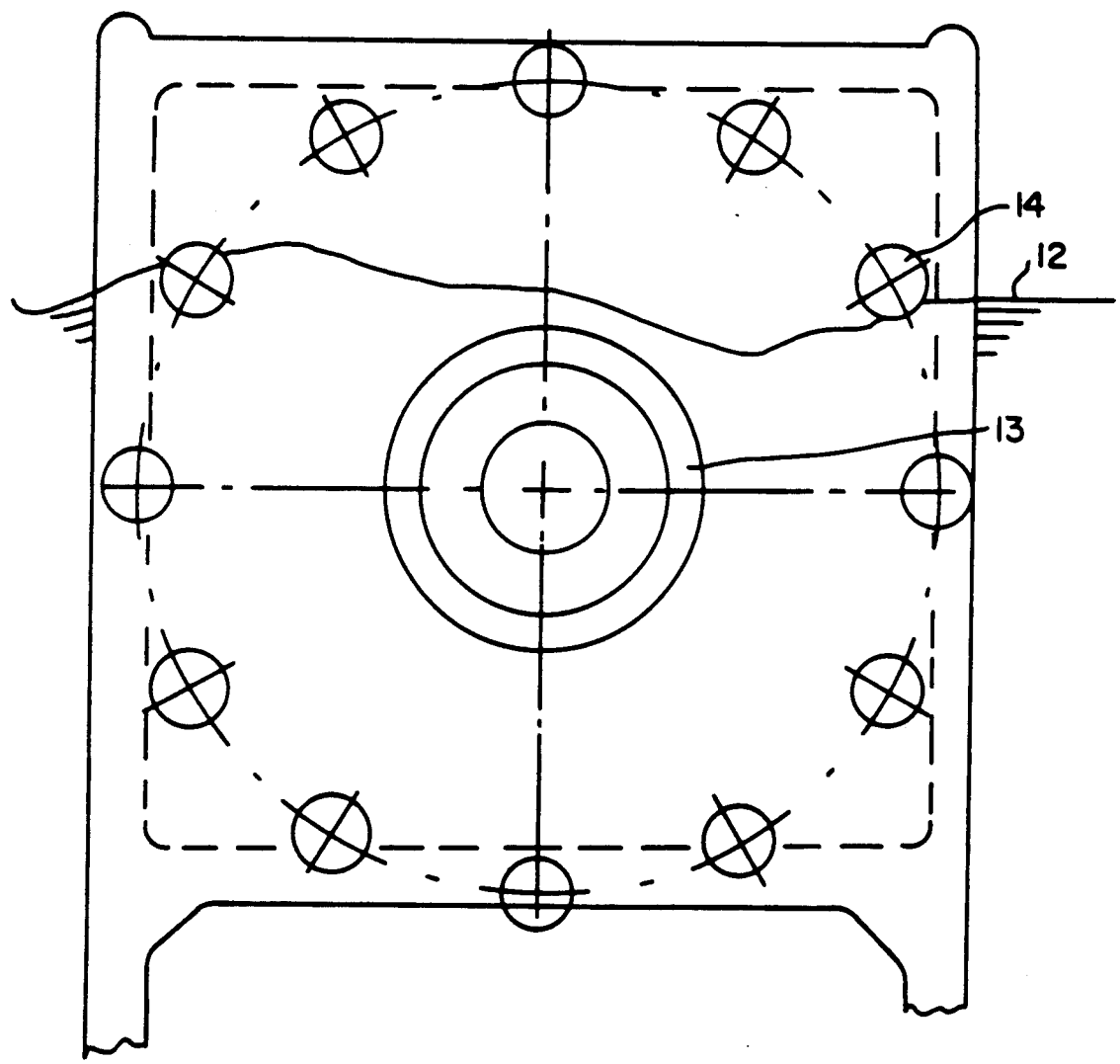
FIGS. 5 and 6 shows a lateral view and a partially sectioned drawing of a top view of a first practical example of a connecting member for linking adjoining zigzag elements of a floating zigzag breakwater.
Figure 6:
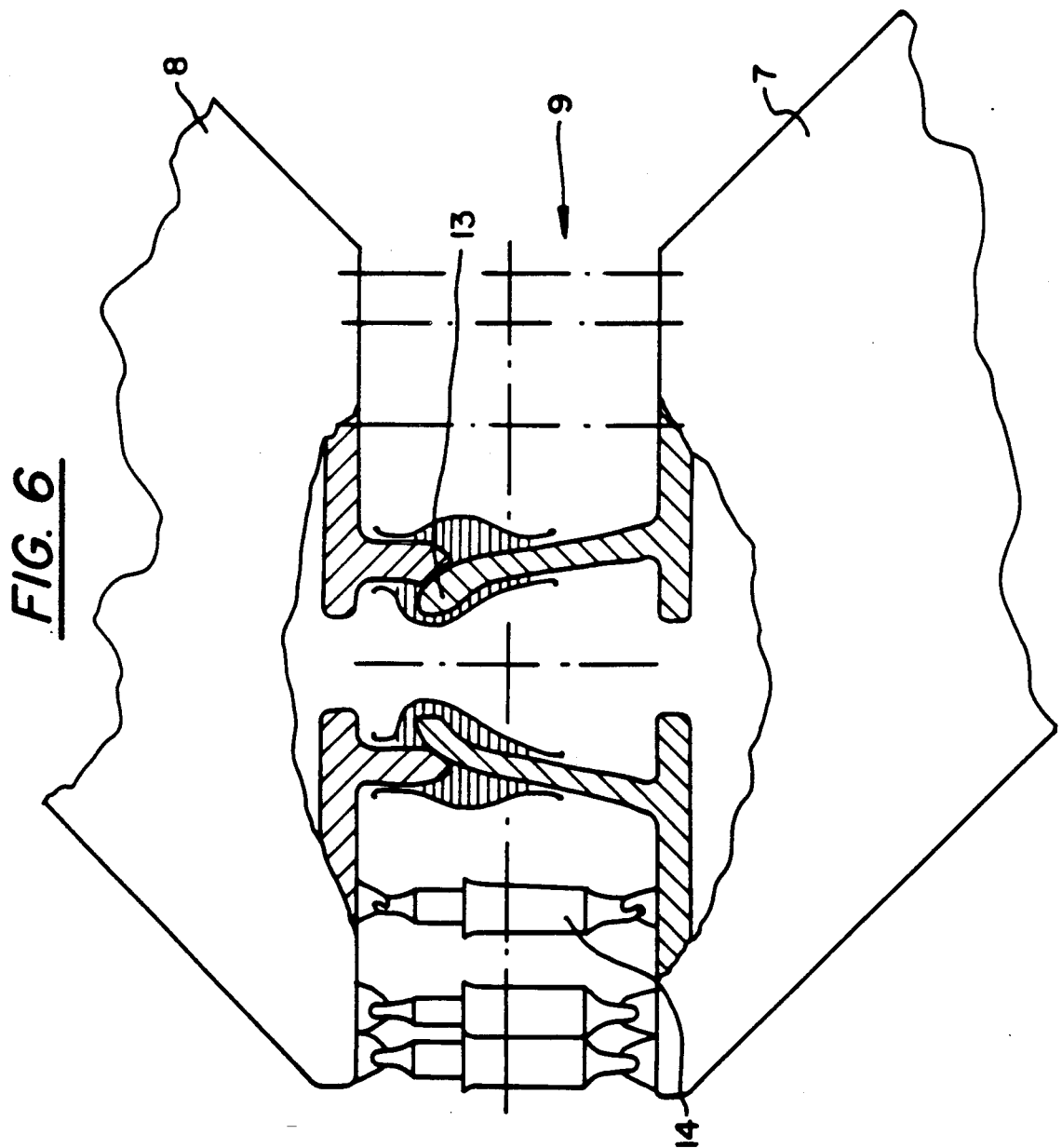

The connecting members 9 are able to fulfill these functions if they are - similar to the connecting member shown in FIGS. 5 and 6—sufficiently shear-, tug-, and thrust-transmitting, yet permit a damped torsional and flexural motion. For this purpose, the connecting member according to ForURES 5 and 6 has an esentially shear-, tug-, and thrust-transmitting spherical joint 13 which is enclosed in a lubricant-tight capsule. The spherical joint 13 is surrounded by a ring of pre-tensioned shock absorbers 14 or tension-spring energy-producing cylinders which connect the zigzag elements 7 and 8 to each other.

Figure 7:
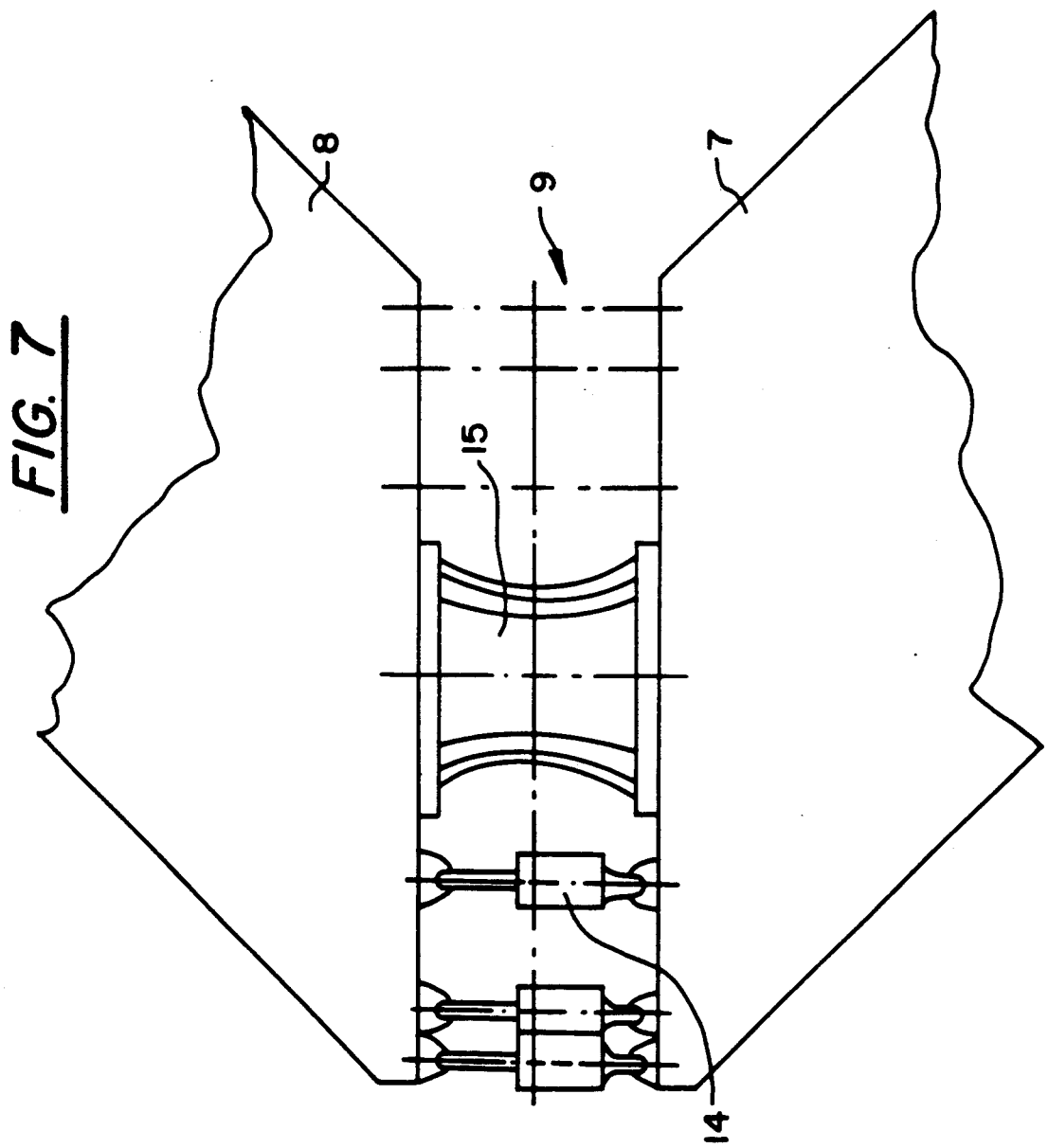
FIG. 7 shows the top view of a second practical example of a connecting member.

FIG. 7 shows a second practical example of a connecting member 9. This connecting member 9 consists of an esentially shear-, tug-, and thrust-transmitting flexible connector 15 which is surrounded in the same way as the spherical joint 13 in the practical example according to FIGS. 5 and 6 by a ring of shock absorbers 14 or energy-producing cylinders which connect the zigzag elements 7 and 8 to each other.

Figure 8:
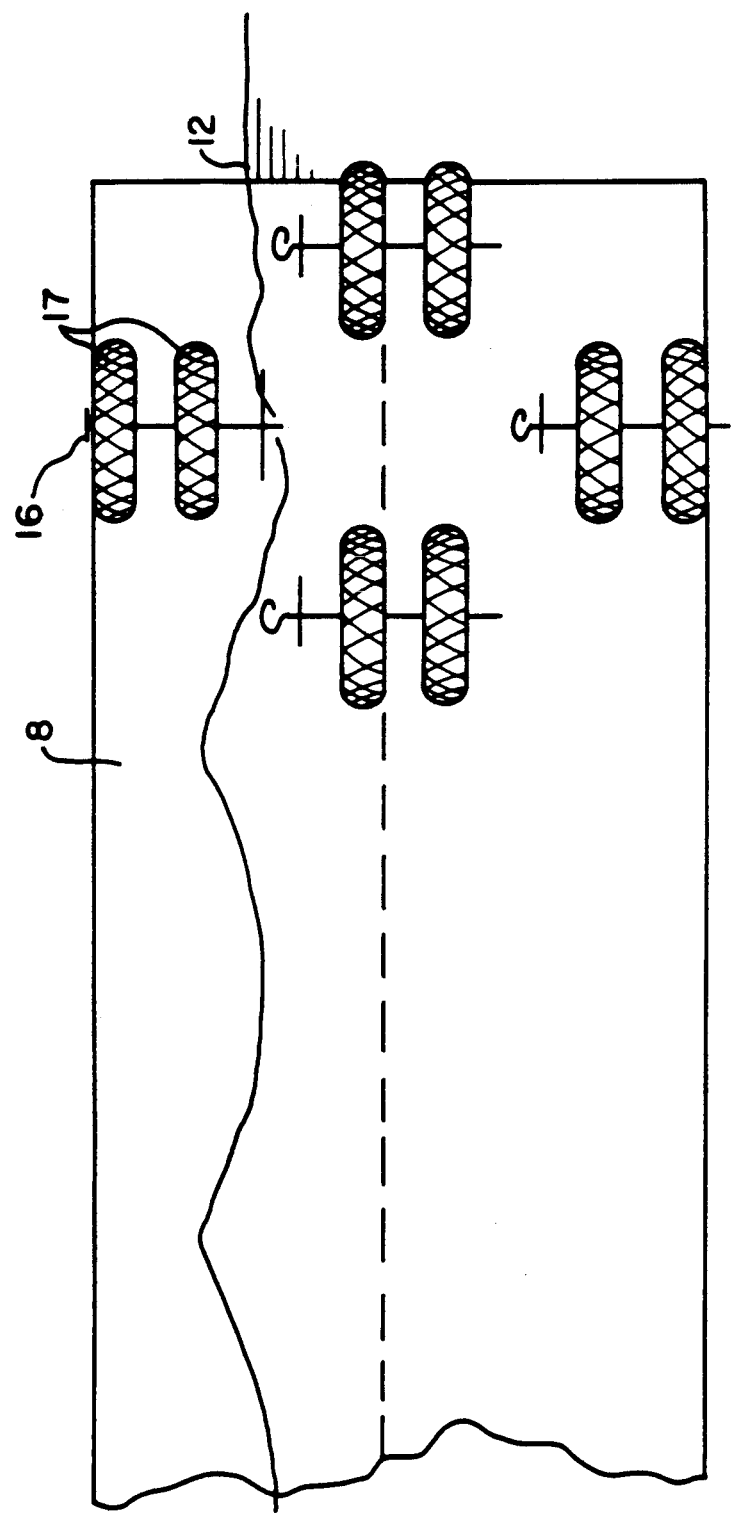
FIGS. 8 and 9 show the lateral view and the top view of a third practical example of a connecting member.
Figure 9:
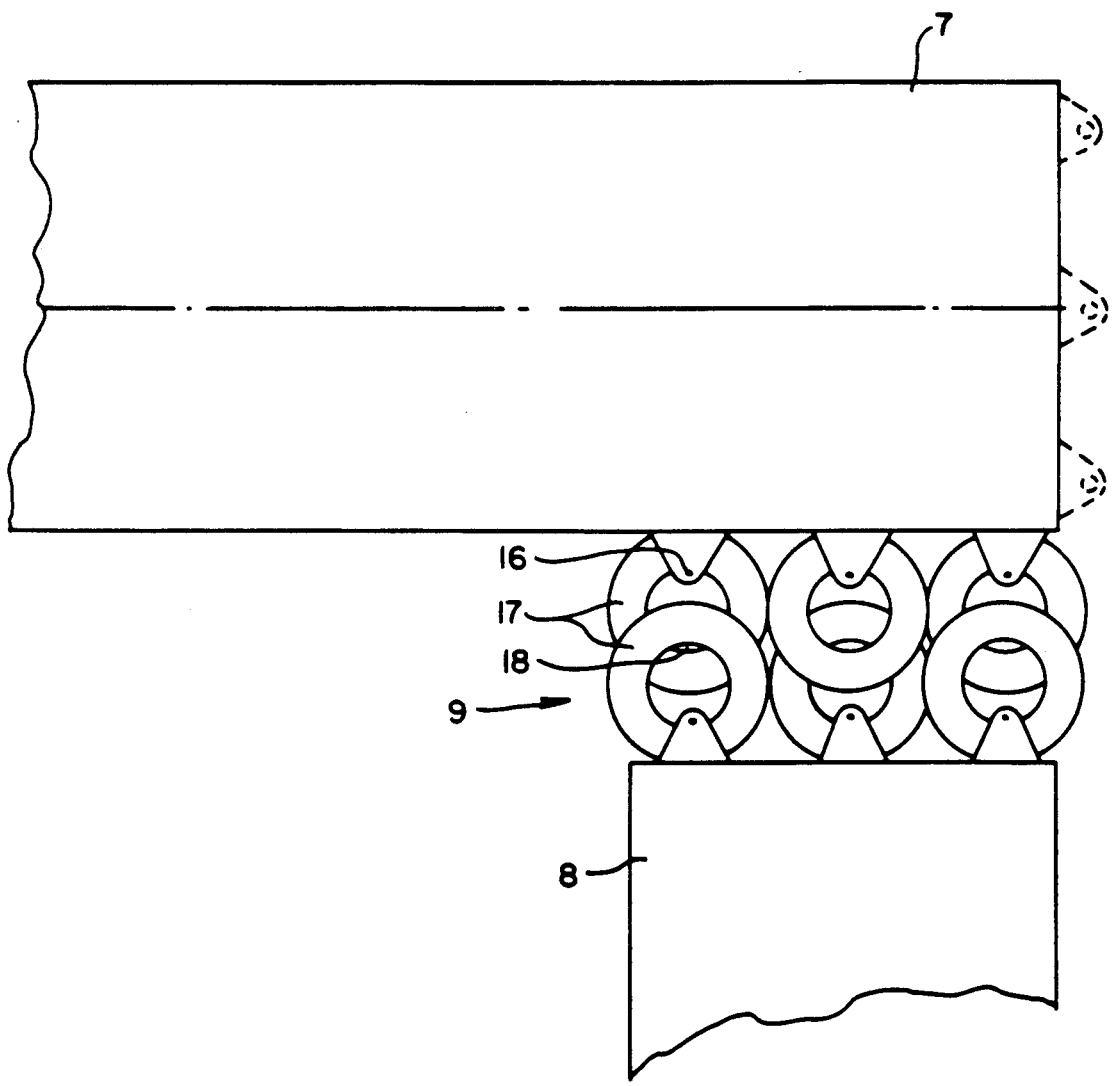

A third and less complicated practical example of a connecting member 9 is shown in FIGS. 8 and 9. This connecting member 9 is particularly suitable for use in a zigzag breakwater which serves also as a floating pier. By means of bolts 16, scrap tires 17 are coupled to the adjoining end surfaces of the zigzag elements 7 and 8 which in this case meet at right angles. In the practical example illustrated in the figure, there are four groups of two scrap tires each aligned at a certain distance above each other. The scrap tires 17 of one f the zigzag elements 7 overlap with hose of the other zigzag element 8 and are connected by means of bolts 18 in the overlapping parts. The advantage of this type of connecting member 9 is that it is very simple to construct; however, it does not fully possess the shear, tug, and thrust transmittance desired, so that it will be used only in cases in which the wave action is light, such as in smaller lakes.

In addition to damping the oscillations by means of the connecting members 9, it is also possible to install other damping members (not shown) on the zigzag elements 7 and 8 to reduce the oscillations caused by the heaving and pitching in long-wave sea motions such as damping chambers, with open bottom, partitioned, with controllable air valves, trimming tanks with pumps, trimming fins which react to the orbital motion of the waves, moving weights, etc.

Floating zigzag breakwaters can be designed so as to be foldable as shown in FIGS. 10 to 14, if the zigzag elements 7 and 8-when seen from the top are sufficiently thin. Such a breakwater has the following advantages:

1. extraordinary cost-benefit ration, i.e, effective protection through a simple and inexpensive construction,
2. in fair weather, it can be removed by compactly folding it to provide an open waterway,
3. can be installed afterwards without any modifications to the existing pier.

Figure 10:
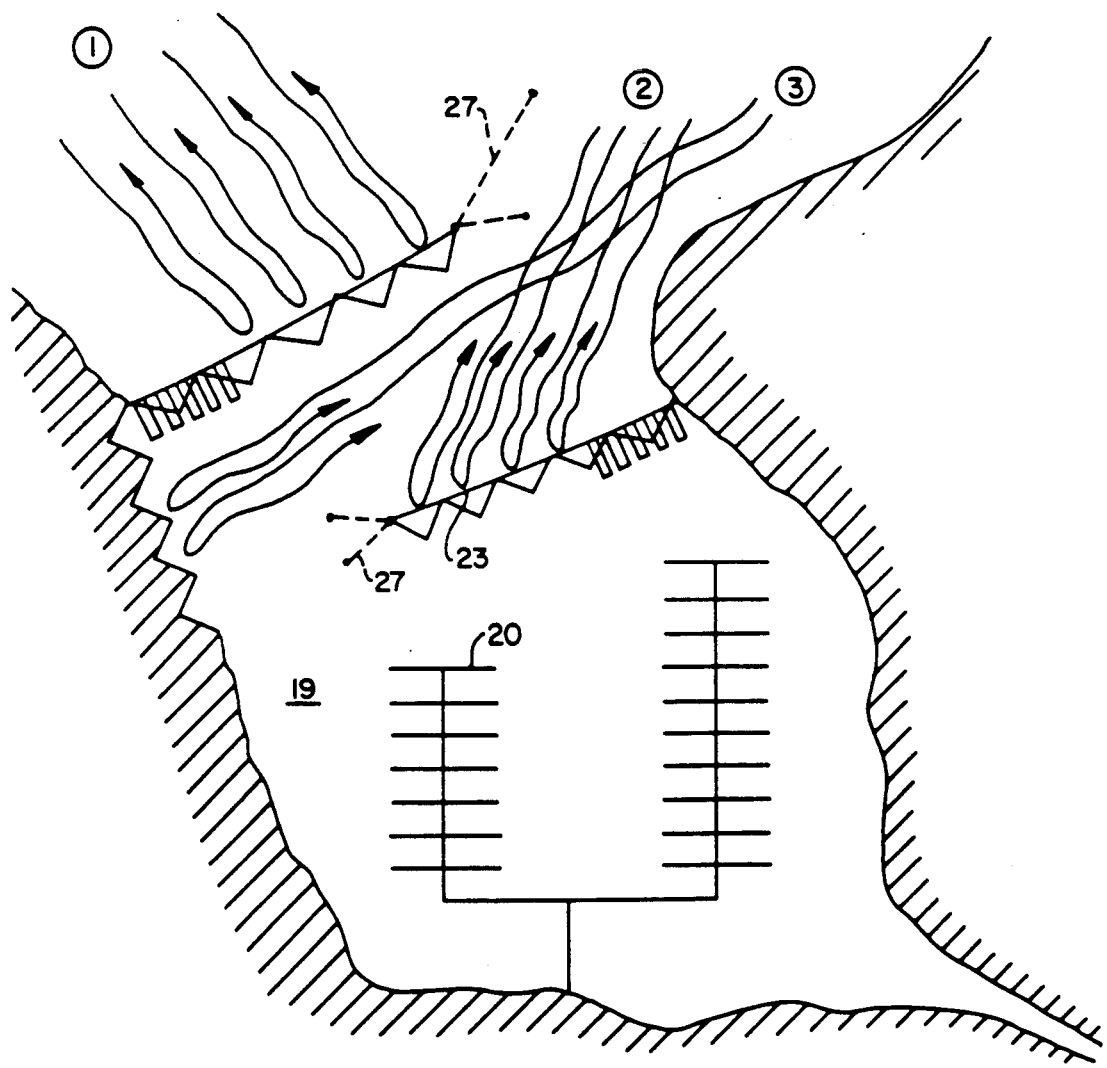
FIG. 10 shows a schematic top view of a boat harbor with a harbor entrance which consists of two floating foldable zigzag breakwaters and one stationary zigzag breakwater embedded into the sea bottom.

In a foldable zigzag breakwater, the connecting elements 9 must, of course, be constructed in such a way that they allow the zigzag elements 7 and 8 to be folded and unfolded In FIG. 10, the boat harbor 19 with the pier 20 is separated from the open sea by means of two staggered foldable zigzag breakwaters. In cooperation with a third stationary zigzag breakwater embedded into the sea bottom, these breakwaters do not permit any waves to enter through the harbor entrance into the boat harbor 19, as is illustrated by the different approaching waves 1, 2 and 3.

Figure 11:
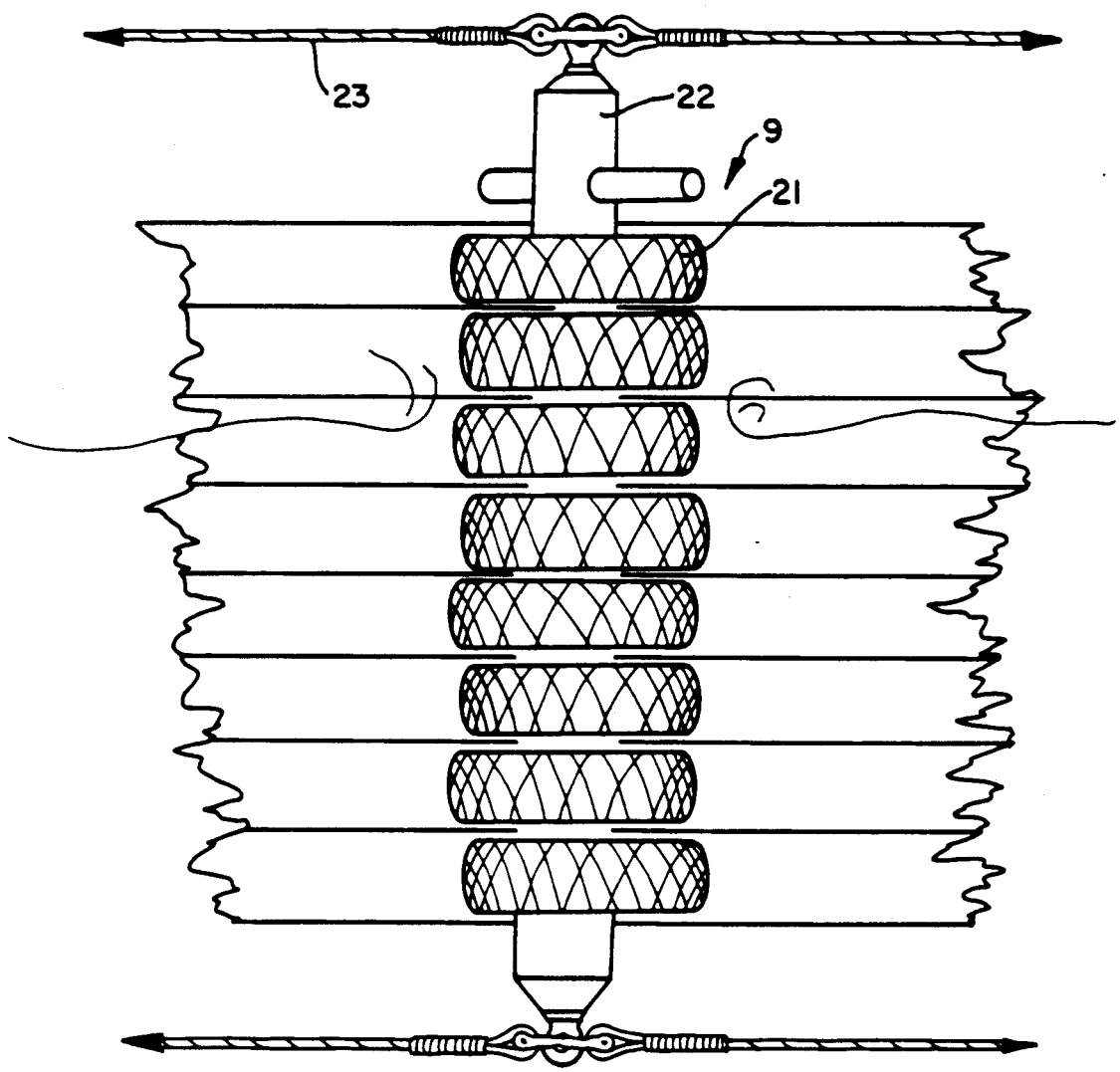
FIGS. 11 and 12 show the lateral view and the top view of a practical example of the hinge connection of two adjoining zigzag elements of a foldable zigzag breakwater.
Figure 12:
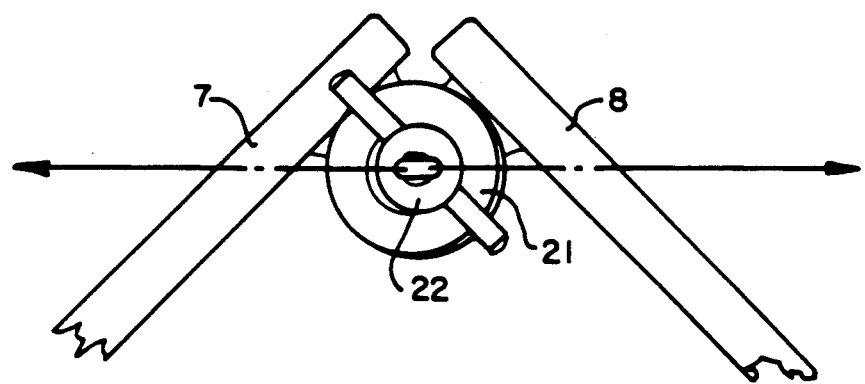

A first practical example of a connecting member 9 for a foldable zigzag breakwater is shown in FIGS. 11 and 12. This connecting member 9 consists of scrap tires 21 which are in alignment with each other and which are alternately attached to one and the other end of adjoining zigzag elements 7 and 8. A bolt 22 is pushed through the scrap tires 21 and serves as a pivot. Guy ropes 23 are connected to the upper and lower ends of these hinge bolts 22. The same type of guy ropes 23 are also used in the practical examples described earlier on a floating zigzag breakwater in order to reinforce the construction. It is particularly advantageous to incorporate shock absorbing elements 24 into the guy ropes.

Figure 13:
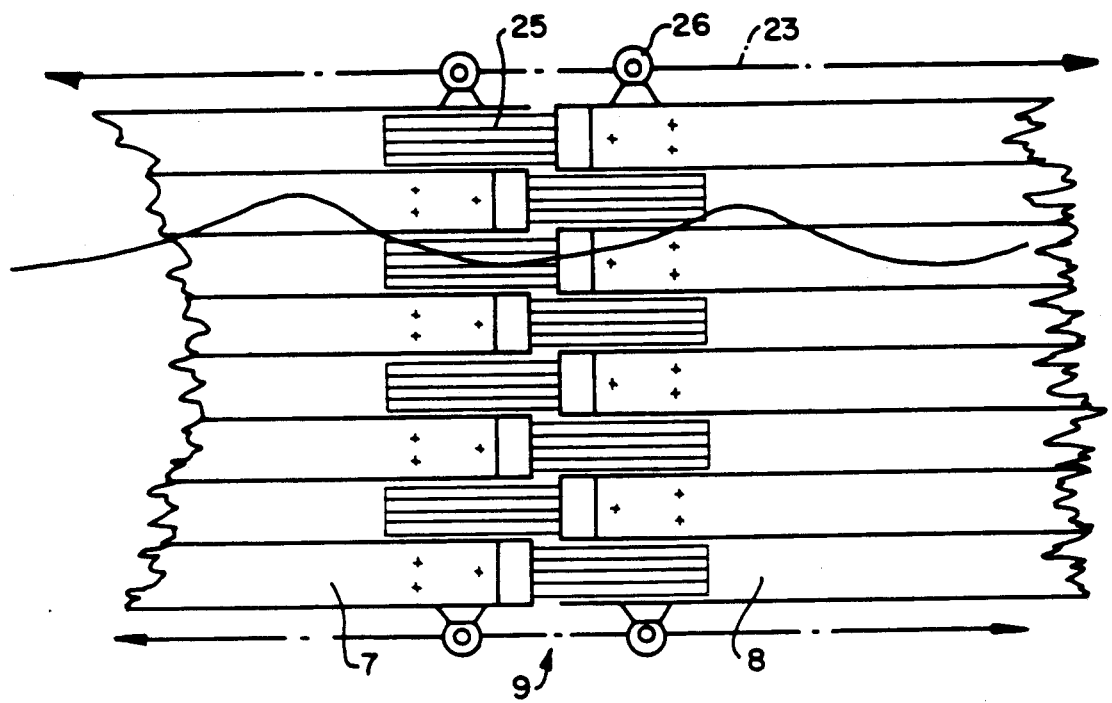
FIGS. 13 and 14 show the lateral view and the top view of a second practical example of a hinge connection of two adjoining zigzag elements of a foldable zigzag breakwater.
Figure 14:
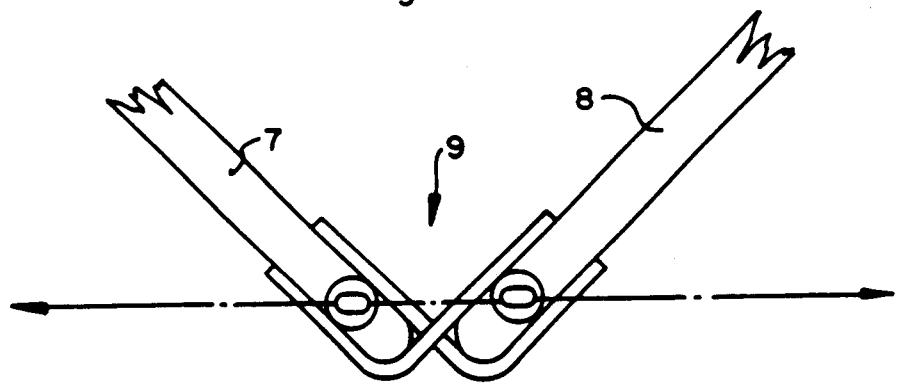

A second practical example of a connecting element 9 for a foldable zigzag breakwater is shown in FIGS. 13 and 14. This connecting elements 9 has rubberized fabric bands 25 or similar devices which are alternately connected to the inside and outside end of adjoining zigzag elements 7 and 8 to form a multiple strap hinge. Again, guy ropes 23 are used which pass through the eyes of the bolts 26 on the upper and lower edges at the ends of the zigzag elements.

As shown in FIG. 4, it is possible to stretch the guy ropes 23 used to reinforce the zigzag breakwater both on the inside and on the outside. In less exposed situations, it is also possible to stretch guy ropes 23 only on the outside or sea side, as illustrated in FIG. 10. The floating zigzag breakwater should be suitably anchored, for example, to the bottom of the harbor in order to keep it from drifting, as indicated by 27 in FIG. 10.

It should also be mentioned that, due to the vetical bending resistance and the torsion resistance of the folding joints, the zigzag elements of foldable breakwaters must be designed to yield to torsion, as in practice they are, to ensure that in emergencies the breakwater can withstand the force of the waves without damage.

I claim:

1. A zigzag breakwater with essentially straight-line stationary zigzag elements embedded into the sea bottom and whose side walls face the attacking waves essentially run perpendicular to the calm water surface, characterized by the fact that the side walls form right angles with each other, the length (1) of the side walls is at least 5 to 8 times as great or greater than the depth of water (d) and that the total height (h) of the wave-reflecting side walls (4) is 2 to 2.5 times greater than the depth of the water wherein d is measured from a breakwater grounding to a calm water level at high tide.

* * * * *